(12) United States Patent
Pal et al.

(10) Patent No.: US 12,494,698 B2
(45) Date of Patent: Dec. 9, 2025

(54) SYSTEMS AND METHODS FOR COOLING MOTORS

(71) Applicant: Hamilton Sundstrand Corporation, Charlotte, NC (US)

(72) Inventors: Debabrata Pal, Hoffman Estates, IL (US); Viktor Kilchyk, Lancaster, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 223 days.

(21) Appl. No.: 18/220,698

(22) Filed: Jul. 11, 2023

(65) Prior Publication Data

US 2025/0023425 A1  Jan. 16, 2025

(51) Int. Cl.
*H02K 9/10* (2006.01)
*B64D 13/08* (2006.01)
*H02K 7/14* (2006.01)

(52) U.S. Cl.
CPC .............. *H02K 9/10* (2013.01); *B64D 13/08* (2013.01); *H02K 7/14* (2013.01)

(58) Field of Classification Search
CPC . H02K 9/10; H02K 7/14; B64D 13/08; B64D 2013/0644; B64D 13/06
See application file for complete search history.

(56) References Cited

U.S. PATENT DOCUMENTS

| | | | |
|---|---|---|---|
| 2018/0331599 A1* | 11/2018 | Parlante | H02K 9/04 |
| 2021/0123379 A1 | 4/2021 | Katsumata et al. | |
| 2022/0340287 A1* | 10/2022 | Mackin | B64D 13/08 |
| 2023/0075905 A1 | 3/2023 | Pal | |

FOREIGN PATENT DOCUMENTS

JP    2004245193 A    9/2004

OTHER PUBLICATIONS

European Search Report dated Oct. 15, 2024 in connection with European Patent Application No. 24176033.9, 5 pages.

* cited by examiner

*Primary Examiner* — Tulsidas C Patel
*Assistant Examiner* — Mohammed Ahmed Qureshi

(57) ABSTRACT

In accordance with at least one aspect of this disclosure, a system includes an airflow line, a main compressor disposed in the airflow line configured to receive a ram air flow and supply a compressed air flow to the air flow line, and a motor operatively connected to drive the main compressor. An air cycle machine is disposed in the airflow line downstream of the main compressor configured to receive the compressed airflow and supply a cooled cabin airflow to an aircraft cabin. A cooling line tap disposed in the airflow line downstream of the air cycle machine configured to communicate a flow of cooling air to the motor from the airflow line to supply a portion of the cooled cabin airflow to one or more portions of the motor as motor cooling air via a first cooling airflow line.

20 Claims, 3 Drawing Sheets

SYSTEMS AND METHODS FOR COOLING MOTORS

TECHNICAL FIELD

The present disclosure relates to cooling systems and more particularly to cooling systems for cooling motors, e.g., motors for driving a compressor.

BACKGROUND

High speed and high-power permanent magnet motor and bearings need sufficient cooling. In existing motor cooling systems, there may be circumstances, e.g. in the case of aircraft certain environmental conditions, where cooling flow is limited and bearing cooling air temperature is too high to provide sufficient cooling. This can result in overheated motor bearings and/or stators resulting in early field failure and reduction in reliability if not mitigated.

The conventional techniques have been considered satisfactory for their intended purpose. However, there is an ever present need for improved systems and methods for alternative means for cooling motor bearings, rotors, and stators. This disclosure provides a solution for this need.

SUMMARY

In accordance with at least one aspect of this disclosure, a system includes an airflow line, a main compressor disposed in the airflow line configured to receive a ram air flow and supply a compressed air flow to the air flow line, and a motor operatively connected to drive the main compressor. An air cycle machine is disposed in the airflow line downstream of the main compressor configured to receive the compressed airflow and supply a cooled cabin airflow to an aircraft cabin. A cooling line tap disposed in the airflow line downstream of the air cycle machine configured to communicate a flow of cooling air to the motor from the airflow line to supply a portion of the cooled cabin airflow to one or more portions of the motor as motor cooling air via a first cooling airflow line.

In embodiments, the air cycle machine can further include an air cycle machine compressor operatively connected to drive a first turbine with exhaust from the main compressor and a second turbine fluidly connected to be driven by exhaust of the air cycle machine compressor downstream of the first turbine. The cooling line tap fluidly connects the motor to the airflow line at an outlet of the second turbine.

The motor can further include one or more air bearings, and the one or more portions of the motor can include the one or more air bearings of the motor. In certain embodiments, the cooling tap can be a first cooling tap, and the motor can also include a rotor-stator portion. In certain such embodiments, a second cooling line tap can be disposed in the airflow line upstream of the main compressor configured to fluidly communicate the ram air flow with the rotor-stator portion to provide a cooling airflow to the rotor-stator portion of the motor via a second cooling airflow line. In embodiments, the rotor-stator portion of the motor can include a permanent magnet, an induction or synchronous rotor and the stator can include a stator winding and stator core. In certain embodiments, the rotor-stator portion of the motor can include cooling air flow in the stator back iron heat exchanger and air flow through the rotor stator gap.

In certain embodiments, an ejector can be disposed in the first cooling line and the second cooling line downstream of each of the first cooling line tap and the second cooling line tap configured allow the cooling airflow in the first cooling airflow line to pass to the one or more air bearings of the motor and to entrain the ram airflow into the second cooling airflow line through the ejector to supply the cooling flow in the second cooling tap to the rotor-stator portion of the motor.

In certain embodiments, the motor can further include one or more air bearings, and a rotor-stator portion, and the one or more portions of the motor includes the one or more air bearings and the rotor-stator portion such that only one cooling line and one cooling line tap is included to cool both portions of the motor.

In certain embodiments, the cooling line tap can be a passive tap configured to passively bleed cooling air to the cooling line.

In certain embodiments, a valve can be disposed in the airflow line such that the cooling tap is actively controlled by the valve. The valve can be configured to control an open-closed state of the cooling tap based on a state of the valve.

In certain embodiments, the valve can be actively controlled by a controller. In certain embodiments, the controller can be configured to control a state of the valve based at least in part on an ambient environmental condition (e.g., in the case of aircraft, an external air temperature, an external air pressure, and external wind speed).

In certain embodiments, the main compressor is a cabin air compressor, and in certain such embodiments, the controller can be configured to control a state of the valve based at least in part on a flight phase (e.g., grounded, take-off, cruise, descent).

In embodiments, the system can include a first heat exchanger disposed in the airflow line downstream of the main compressor and upstream of the air cycle machine configured to cool the compressed airflow before supplying the compressed airflow to the air cycle machine. A second heat exchanger can be disposed in the airflow line downstream of the air cycle machine compressor configured to further cool the compressed airflow before supplying the cooled airflow to the aircraft cabin. A condenser and water extractor can be disposed in the airflow line downstream of the second heat exchanger configured to remove excess water from the cooled airflow before supplying the cooled airflow to the aircraft cabin.

In accordance with at least one aspect of this disclosure, a method can include, cooling a motor configured to drive cabin air compressor of an aircraft with a cooling airflow from at least an outlet of an air cycle machine downstream of the cabin air compressor.

In certain embodiments, cooling can further include cooling the motor with a ram air flow upstream of the cabin air compressor in addition to the cooling airflow from the outlet of the air cycle machine.

In certain embodiments, cooling can further include supplying a first cooling air flow to a bearing cooling path, wherein the bearing cooling path fluidly connects to the cooling airflow from the outlet of the air cycle machine, and supplying a second cooling air flow to a rotor-stator cooling path, wherein the rotor-stator cooling path fluidly connects to the ram airflow upstream of the cabin air compressor.

In certain embodiments, cooling can include supplying cooled air to the motor and supplying cooled air to an aircraft cabin at the same time.

In certain embodiments, cooling can include supplying cooled air to the motor while an aircraft housing the cabin air compressor is grounded and no ram airflow is available.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein.

DETAILED DESCRIPTION

Figure 1:
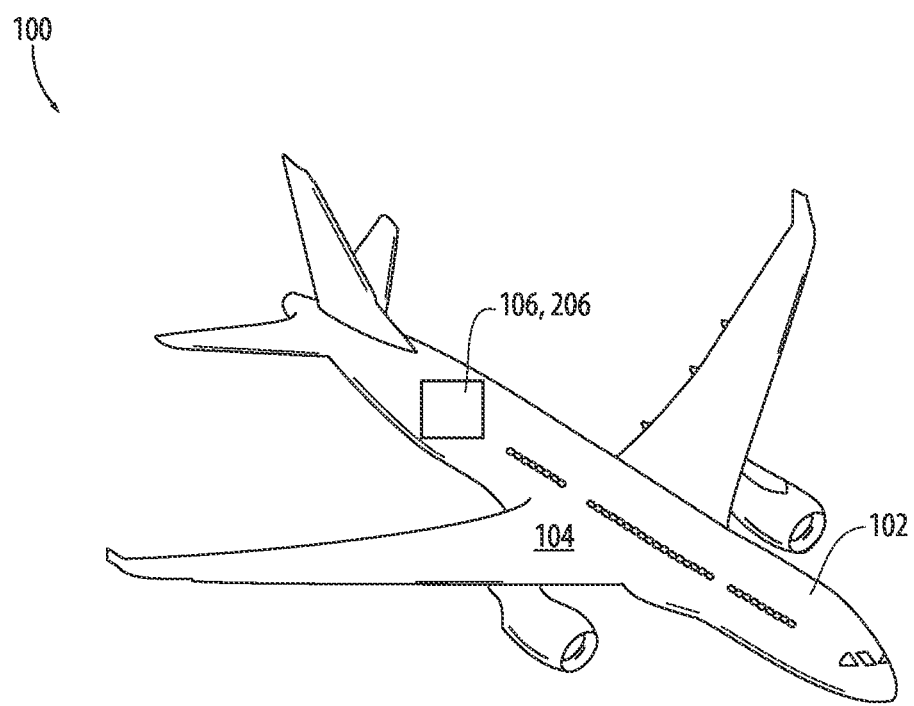
FIG. 1 is a perspective view of a system in accordance with this disclosure, showing an aircraft having an environmental control system.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-3.

Figure 2:
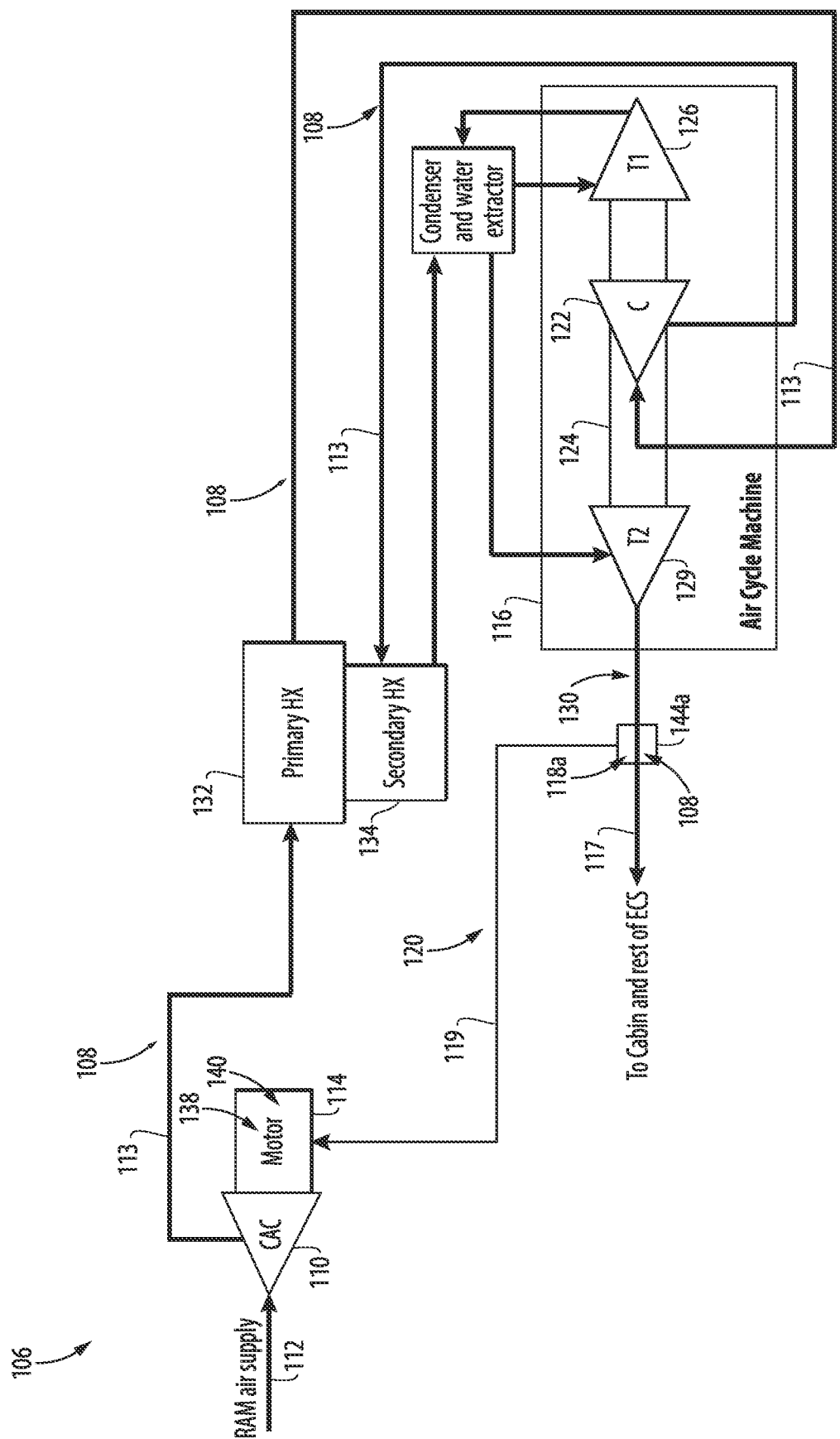
FIG. 2 is a schematic diagram of an embodiment of the environmental control system of FIG. 1.
Figure 3:
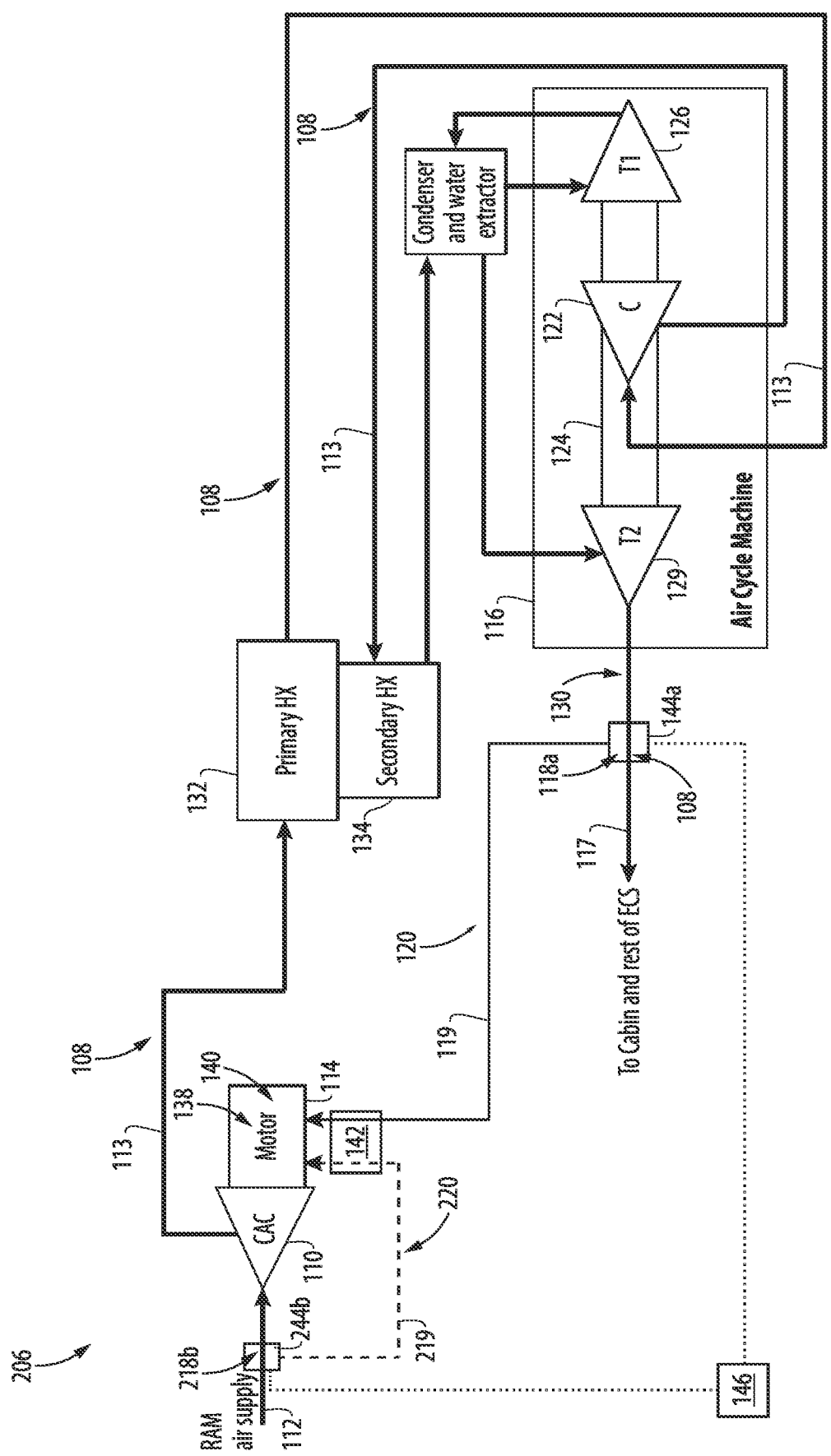
FIG. 3 is a schematic diagram of another embodiment of the environmental control system of FIG. 1.

In accordance with at least one aspect of this disclosure, as shown in FIGS. 1-3, a system 100 can include an aircraft 102 having an aircraft cabin 104. The system 100 can include an environmental control system (ECS) 106, including at least, a cabin air compressor, one or more heat exchangers, a condenser/water extractor, an air cycle machine, a compact mixer, a supply duct, and an air distribution system configured to cool and supply ram air to the aircraft cabin 104.

Referring now to FIGS. 2 and 3, the ECS can include an airflow line 108 (as denoted by the thick black arrows) and a main compressor 110 (e.g., the cabin air compressor) disposed in the airflow line 108. The main compressor 110 can be configured to receive a ram air flow 112 and supply a compressed air flow 113 to the air flow line 108. A motor 114 can be operatively connected to drive the main compressor 110. The air cycle machine 116 can be disposed in the airflow line 108 downstream of the main compressor 110 configured to receive the compressed airflow 113 and supply a cooled cabin airflow 117 to the aircraft cabin 104 and remaining portions of the ECS (e.g., the compact mixer, supply duct, and air distribution system) downstream of the air cycle machine 116. A cooling line tap 118 can be disposed in the airflow line 108 downstream of the air cycle machine 116 configured to communicate a flow of cooling air 119 to the motor 114 from the airflow line via a cooling line 120. The cooling line 120 can be configured to supply a portion of the cooled cabin airflow 117 to one or more portions of the motor as motor cooling air 119.

In embodiments, e.g., as shown, the air cycle machine 116 can further include an air cycle machine compressor 122 operatively connected via shaft 124 to drive a first turbine 126 with exhaust from the main compressor 110 and a second turbine 128 fluidly connected to be driven by exhaust of the air cycle machine compressor 122 and/or the first turbine 126 downstream of the first turbine 126. The cooling line tap 118 can fluidly connect the motor 114 to the airflow line 108 at an outlet 130 of the second turbine 128.

In embodiments, the ECS 106 can also include a first heat exchanger 132 disposed in the airflow line 108 downstream of the main compressor 110 and upstream of the air cycle machine 106 configured to cool the compressed airflow 113 before supplying the compressed airflow 113 to the air cycle machine 106. A second heat exchanger 134 can be disposed in the airflow line 108 downstream of the air cycle machine compressor 122 configured to further cool the compressed airflow 113 before supplying the cooled airflow 117 to the aircraft cabin 104. The condenser and water extractor 136 can be disposed in the airflow line 108 downstream of the second heat exchanger 134 configured to remove excess water from the cooled airflow 117 before supplying the cooled airflow 117 to the aircraft cabin 104.

The motor 114 can further include one or more air bearings 138, and a rotor-stator portion 140. In certain embodiments, the rotor-stator portion 140 of the motor 114 can include a permanent magnet, an induction or synchronous rotor and the stator can include a stator winding and stator core. In certain embodiments, the rotor-stator portion of the motor receive the cooling air flow in the stator back iron heat exchanger and air flow through the rotor stator gap. Conventionally, the bearings 138 and rotor-stator 140 receive cooling airflow from the ram air supply, or from the airflow line 108 at the outlet of the first heat exchanger 132. However, in certain conditions, this airflow may not provide sufficient cooling, for example if the aircraft is grounded and there is no airflow, or if the ambient temperature external to the aircraft 102 is too hot.

As shown in FIG. 2 the bearings 138 and rotor-stator 140 of the motor 114 can receive the cooling airflow 119 from the outlet 130 of the air cycle machine 116, via cooling the cooling line 120 which can provide significantly cooler air (e.g., about 7 to 8° C. as compared to cooling air of over 37° C. in conventional systems). As shown in FIG. 2, only one cooling line 120 and one cooling line tap 118 can be included to cool both portions of the motor 114 as described above.

In certain embodiments, referring now to FIG. 3, the ECS 206 can have similar components as in ECS 106 of FIG. 2. For brevity, the description of common elements that have been described above for FIG. 2 are not repeated with respect to FIG. 3. In ECS 206, the cooling tap 118 can be a first cooling tap 118a and a second cooling line tap 218b can be disposed in the airflow line 108 upstream of the main compressor 110 configured to communicate a portion of the ram air flow 112 with the rotor-stator portion 140 of the motor 114 to provide a second cooling airflow 219 via a second cooling line 220 to the rotor-stator portion 140 of the motor 114. Here, the air bearings 138 of the motor 114 can still be cooling with the cooling line 120 as described above with respect to ECS 106. The cooling air 119 going to the air bearings 138 and the cooling air 219 going to the rotor-stator portion 140 can be fluidly isolated within the motor until both are exhausted from the motor 114, where they are exhausted together.

In certain embodiments, e.g., as shown in FIG. 3, an ejector 142 can be disposed in the first cooling line 120 and the second cooling line 220 downstream of both the first and second cooling line taps 118a, 218b configured allow the cooling airflow 119 of the first cooling airflow line 120 to pass to the air bearings 138 of the motor 114. In passing the cooling airflow 119, the ejector can entrain the ram airflow 112 into the second cooling airflow line 220 as the second cooling airflow 219 to supply the cooling air flow 219 in the second cooling airflow line 220 to the rotor-stator portion 140 of the motor 114.

In certain embodiments, one or both of the cooling line taps 118*a*, 218*b* can be a passive tap configured to passively bleed cooling air to the respective cooling lines 120, 220. In certain embodiments, e.g. one or both of the cooling line taps 118*a*, 218*b* can be or include a valve 144*a*, 244*b*. The valve 144*a*, 244*b* can be disposed in the airflow line 108 such that the cooling tap 118*a*, 218*b* is actively controlled by the valve 144*a*, 244*b*, such that the valve 144*a*, 244*b* can control an open-closed state of the cooling tap 118*a*, 218*b* based on a state of the valve 144*a*, 244*b*. The valve 144*a*, 244*b* can have an open position a closed position, and any intermediate position in between to control an amount of cooling airflow 119, 219 that enters each of the cooling airflow lines 120, 220.

In certain embodiments, the valve 144*a*, 244*b* can be actively controlled by a controller 146. In certain embodiments, the controller 146 can be configured to control a state of the valve 144*a*, 244*b* based at least in part on an ambient environmental condition (e.g., in the case of aircraft, an external air temperature, an external air pressure, and external wind speed, among others). In embodiments, the controller 146 can be configured to control a state of the valve 144*a*, 244*b* based at least in part on a flight phase (e.g., grounded, take-off, cruise, descent), in addition to the environmental conditions noted above.

In accordance with at least one aspect of this disclosure, still with reference to FIGS. 2 and 3, a method can include, cooling a motor (e.g., motor 114) configured to drive cabin air compressor (e.g., main compressor 110) of an aircraft with a cooling airflow (e.g., cooling airflow 119 and cooled cabin air 117) from at least an outlet of an air cycle machine (e.g., air cycle machine 116) downstream of the cabin air compressor.

In certain embodiments, cooling can further include cooling the motor with a ram air flow (e.g., ram air flow 112 and cooling flow 219) upstream of the cabin air compressor in addition to the cooling airflow from the outlet of the air cycle machine.

In certain embodiments, cooling can further include supplying a first cooling air flow (e.g., cooling airflow 119) to a bearing cooling path (e.g., airflow line 120), wherein the bearing cooling path fluidly connects to the cooling airflow from the outlet of the air cycle machine, and supplying a second cooling air flow (e.g., cooling airflow 219) to a rotor-stator cooling path (e.g., cooling airflow line 220), wherein the rotor-stator cooling path fluidly connects to the ram airflow upstream of the cabin air compressor.

In certain embodiments, cooling can include supplying cooled air to the motor and supplying cooled air to an aircraft cabin at the same time. In certain embodiments, cooling can include supplying cooled air to the motor while an aircraft housing the cabin air compressor is grounded and no ram airflow is available.

In embodiments, bearing and/or rotor/stator cooling flow can be tapped at an air cycle machine second turbine outlet (e.g., outlet 130), where the temperature at the outlet can be about 8° C. (e.g., about 46° F.). Tapping at least the bearing cooling flow as shown in embodiments can reduce bearing foil temperature from about 127° C. to about 102° C. as compared to conventional systems, and as a result of tapping both bearing and rotor/stator flow as shown in embodiments can reduce stator temperatures from about 216° C. to about 186° C. as compared to conventional systems.

Embodiments as described herein can reduce the weight and size of the ECS due to removal of the cabin air compressor motor cooling scoop and scoop housing. In embodiments, the scoop may not be needed at all because the cooling airflow is coming from existing ram air flow. Embodiments provide a higher power to weight ratio and greater reliability in motor components due to the bearings and stator being kept at acceptable temperatures.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "controller." A "circuit," "module," or "controller" can include one or more portions of one or more separate physical hardware and/or software components that can together perform the disclosed function of the "circuit," "module," or "controller", or a "circuit," "module," or "controller" can be a single self-contained unit (e.g., of hardware and/or software). Furthermore, aspects of this disclosure may take the form of a computer program product embodied in one or more computer readable medium(s) having computer readable program code embodied thereon.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising:
   an airflow line;
   a main compressor disposed in the airflow line and configured to receive a ram airflow and supply a compressed airflow to the airflow line;
   a motor operatively connected to drive the main compressor;
   an air cycle machine disposed in the airflow line downstream of the main compressor and configured to receive the compressed airflow and supply a cooled cabin airflow; and
   a cooling line tap disposed in the airflow line downstream of the air cycle machine and upstream of an aircraft cabin and configured to supply a first portion of the cooled cabin airflow to one or more portions of the motor as motor cooling air via a first cooling airflow line, the airflow line configured to provide a second portion of the cooled cabin airflow to the aircraft cabin.

2. The system of claim 1, wherein the air cycle machine comprises:
   an air cycle machine compressor operatively connected to drive a first turbine with exhaust from the main compressor; and
   a second turbine fluidly connected to be driven by exhaust of the air cycle machine compressor and/or the first turbine downstream of the first turbine.

3. The system of claim 2, wherein the cooling line tap fluidly connects the motor to the airflow line at an outlet of the second turbine.

4. The system of claim 3, wherein the motor comprises one or more air bearings, and wherein the one or more portions of the motor include the one or more air bearings of the motor.

5. The system of claim 4, wherein the cooling line tap is a first cooling line tap, wherein the motor further comprises a rotor-stator portion, and further comprising a second cooling line tap disposed in the airflow line upstream of the main compressor and configured to communicate a portion of the ram airflow with the rotor-stator portion to provide a cooling airflow to the rotor-stator portion of the motor via a second cooling airflow line.

6. The system of claim 5, further comprising an ejector disposed in the first cooling airflow line and the second cooling airflow line downstream of each of the first cooling line tap and the second cooling line tap and configured to allow the motor cooling air in the first cooling airflow line to pass to the one or more air bearings of the motor and to entrain the ram airflow into the second cooling airflow line and through the ejector to supply the cooling airflow in the second cooling line tap to the rotor-stator portion of the motor.

7. The system of claim 3, wherein the motor comprises one or more air bearings and a rotor-stator portion, and wherein the one or more portions of the motor include the one or more air bearings and the rotor-stator portion.

8. The system of claim 1, further comprising a valve configured to control an open-closed state of the cooling line tap based on a state of the valve.

9. The system of claim 8, wherein the valve is configured to be actively controlled by a controller.

10. The system of claim 9, wherein the controller is configured to control the state of the valve based at least in part on an ambient environmental condition.

11. The system of claim 9, wherein the main compressor is a cabin air compressor, and wherein the controller is configured to control the state of the valve based at least in part on a flight phase.

12. The system of claim 1, further comprising a first heat exchanger downstream of the main compressor and upstream of the air cycle machine and configured to cool the compressed airflow before supplying the compressed airflow to the air cycle machine.

13. The system of claim 12, further comprising a second heat exchanger downstream of an air cycle machine compressor and configured to further cool the compressed airflow before supplying the compressed airflow to the aircraft cabin.

14. The system of claim 13, further comprising a condenser and water extractor downstream of the second heat exchanger and configured to remove excess water from the compressed airflow before supplying the compressed airflow to the aircraft cabin.

15. A method, comprising:
    cooling a motor configured to drive a cabin air compressor of an aircraft with a cooling airflow from at least an outlet of an air cycle machine downstream of the cabin air compressor;
    wherein cooling the motor further comprises cooling the motor with a ram airflow upstream of the cabin air compressor in addition to the cooling airflow from the outlet of the air cycle machine.

16. The method of claim 15, wherein cooling the motor further includes:
    supplying a first cooling airflow to a bearing cooling path, wherein the bearing cooling path fluidly connects to the cooling airflow from the outlet of the air cycle machine; and
    supplying a second cooling airflow to a rotor-stator cooling path, wherein the rotor-stator cooling path fluidly connects to the ram airflow upstream of the cabin air compressor.

17. The method of claim 15, wherein cooling the motor further includes supplying cooled air to the motor and supplying cooled air to an aircraft cabin at the same time.

18. The method of claim 15, wherein cooling the motor further includes supplying cooled air to the motor while an aircraft housing the cabin air compressor is grounded and no ram airflow is available.

19. A system, comprising:
    an airflow line;
    a main compressor disposed in the airflow line and configured to receive a ram airflow and supply a compressed airflow to the airflow line;
    a motor configured to drive the main compressor;
    an air cycle machine disposed in the airflow line downstream of the main compressor and configured to receive the compressed airflow and supply a cooled cabin airflow;
    a first cooling line tap disposed in the airflow line downstream of the air cycle machine and configured to supply a portion of the cooled cabin airflow to one or more portions of the motor as motor cooling air via a first cooling airflow line; and a second cooling line tap disposed in the airflow line upstream of the main compressor and configured to communicate a portion of the ram airflow to provide a cooling airflow to a rotor-stator portion of the motor via a second cooling airflow line.

20. The system of claim 19, further comprising an ejector disposed in the first cooling airflow line and the second cooling airflow line downstream of each of the first cooling line tap and the second cooling line tap and configured to allow the motor cooling air in the first cooling airflow line to pass to one or more air bearings of the motor and to entrain the ram airflow into the second cooling airflow line and through the ejector to supply the cooling airflow in the second cooling line tap to the rotor-stator portion of the motor.

* * * * *